(12) United States Patent
Schultheiss et al.

(10) Patent No.: US 12,345,831 B2
(45) Date of Patent: Jul. 1, 2025

(54) RADAR TRANSMITTER ASSEMBLY HAVING AN INTEGRATED ANTENNA

(71) Applicant: VEGA Grieshaber KG, Wolfach (DE)

(72) Inventors: Daniel Schultheiss, Hornberg (DE); Levin Dieterle, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 422 days.

(21) Appl. No.: 17/427,809

(22) PCT Filed: Feb. 19, 2020

(86) PCT No.: PCT/EP2020/054335
§ 371 (c)(1),
(2) Date: Aug. 2, 2021

(87) PCT Pub. No.: WO2020/169655
PCT Pub. Date: Aug. 27, 2020

(65) Prior Publication Data
US 2022/0120848 A1 Apr. 21, 2022

(30) Foreign Application Priority Data
Feb. 19, 2019 (EP) .................................... 19157998

(51) Int. Cl.
*G01S 7/03* (2006.01)
*H01Q 1/22* (2006.01)
(Continued)

(52) U.S. Cl.
CPC ............. *G01S 7/032* (2013.01); *H01Q 1/225* (2013.01); *H01Q 1/38* (2013.01); *H01Q 15/02* (2013.01)

(58) Field of Classification Search
CPC .................................. G01S 7/032; H01Q 1/38
See application file for complete search history.

(56) References Cited

U.S. PATENT DOCUMENTS 5,285,212 A * 2/1994 McNiece ............... H01Q 9/285
343/893
11,047,725 B2 * 6/2021 Ohlsson .................. G01S 13/88
(Continued)

FOREIGN PATENT DOCUMENTS

CN 103594760 A 2/2014
CN 104617372 A 5/2015
(Continued)

OTHER PUBLICATIONS

Partial European Search Report issued Aug. 13, 2019 in European Patent Application No. 19157998.6, 14 pages.
(Continued)

*Primary Examiner* — Ladimir Magloire
*Assistant Examiner* — Eric K Hodac
(74) *Attorney, Agent, or Firm* — Oblon, McClelland, Maier & Neustadt, L.L.P.

(57) ABSTRACT

A radar transmitter for process and manufacturing automation, level measurement or level limit determination. The radar transmitter includes a generator adapted to generate microwaves, an antenna connected to the generator and adapted to transmit the microwaves from the generator, and a carrier plate. Here, the antenna, by way of an L-shaped angled component, is arranged substantially perpendicular to a printed circuit board and is configured to transmit the microwaves perpendicular to a surface normal of the printed circuit board.

20 Claims, 4 Drawing Sheets

(51) Int. Cl.
*H01Q 1/38* (2006.01)
*H01Q 15/02* (2006.01)

(56) References Cited

U.S. PATENT DOCUMENTS

| | | | |
|---|---|---|---|
| 11,573,288 B2* | 2/2023 | Eberspaecher | G01S 7/03 |
| 2004/0183550 A1 | 9/2004 | Fehrenbach et al. | |
| 2007/0063056 A1 | 3/2007 | Gaucher et al. | |
| 2010/0063733 A1* | 3/2010 | Yunck | G01S 13/90 |
| | | | 701/469 |
| 2013/0016023 A1 | 1/2013 | Gaucher et al. | |
| 2016/0248603 A1 | 8/2016 | Schleef et al. | |
| 2017/0211963 A1 | 7/2017 | Taheri et al. | |
| 2018/0372843 A1* | 12/2018 | Greslehner-Nimmervoll | |
| | | | G01S 13/931 |

FOREIGN PATENT DOCUMENTS

| | | | | |
|---|---|---|---|---|
| DE | 4321411 C1 * | 11/1994 | | H01P 5/10 |
| DE | 44 43 055 A1 | 6/1996 | | |
| DE | 100 51 025 A1 | 4/2002 | | |
| DE | 10 2012 112 218 A1 | 7/2014 | | |
| DE | 10 2014 014 860 B3 | 9/2015 | | |
| DE | 10 2014 207 148 A1 | 10/2015 | | |
| WO | WO 2004/017025 A1 | 2/2004 | | |
| WO | WO 2004/082072 A1 | 9/2004 | | |
| WO | WO-2014090565 A1 * | 6/2014 | | G01F 23/284 |

OTHER PUBLICATIONS

Extended European Search Report issued Nov. 7, 2019 in European Patent Application No. 19157998.6, 12 pages.
Office Action issued Feb. 8, 2022 in corresponding European Patent Application No. 19 157 998.6, 7 pages.
International Search Report issued on May 26, 2020 in PCT/EP2020/054335 filed on Feb. 19, 2020, 3 pages.
Office Action dated Jun. 27, 2024, issued in counterpart CN Application No. 202080012836.7, with English Translation, (16 pages).
Combined Chinese Office and Search Report issued on Jan. 24, 2025 in Chinese Patent Application No. 202080012836.7, 10 pages.

* cited by examiner

RADAR TRANSMITTER ASSEMBLY HAVING AN INTEGRATED ANTENNA

REFERENCE TO RELATED APPLICATIONS

This application claims priority to European Patent Application No. 19 157 998.6, filed Feb. 19, 2019, which is incorporated herein by reference in its entirety.

FIELD OF INVENTION

The invention relates to sensors for level measurement, for limit level determination and/or for range monitoring. In particular, the invention relates to a radar transmitter arrangement. Further, the invention relates to a use.

BACKGROUND

For process and production automation, in particular area monitoring, for level measurement or for limit level determination, for example in a container, various types of measuring devices or sensors are used, for example a level meter with a high-frequency front end. These measuring devices are used in particular to indicate a certain level of a product, e.g. in a container, i.e. to indicate whether a predefined upper, lower or other limit of the level in the container has been reached, or also to determine a topology of the product. The container may be a vessel or measuring tank of any shape. The vessel may also be a channel, for example a stream or river bed. In this case, the high-frequency front end is set up to transmit and receive microwaves or radar waves. Many microwave sensors use a radar chip with an integrated antenna.
CGS:THU

SUMMARY OF THE INVENTION

It is an object of the invention to provide a level measuring device which requires a low constructional effort in manufacturing.

This object is solved by the subject-matter of the independent patent claims. Further embodiments of the invention result from the subclaims and the following description.

A first aspect relates to a radar transmitter arrangement for a sensor for level measurement or level limit determination. The radar transmitter arrangement comprises a generator configured to generate microwaves, an antenna connected to the generator and configured to transmit the microwaves from the generator, and a carrier plate. In this regard, the antenna, by means of an L-shaped angled component, such as a molding, is arranged substantially perpendicular to a printed circuit board and is adapted to transmit the microwaves perpendicular to a surface normal of the printed circuit board.

The generator produces microwaves, for example in a frequency range from 40 to 300 GHz, e.g. in a frequency range above 140 GHz, e.g. above 200 GHz. As a result, the antenna has a radiation characteristic—i.e. narrow and/or high resolution, for example—which is advantageous for level measurement and/or limit determination. The antenna can advantageously be connected to the carrier plate or be designed as part of the carrier plate. For example, the antenna can be part of a radar chip. The antenna or the radar chip may be arranged together with the generator on the carrier plate. The L-shaped angled molded part on which the antenna is arranged can be designed, for example, as an injection-molded interconnect device (MID). Due to the L-shaped angled component or molded part, the radar transmitter arrangement can be adapted to be arranged in a housing, which can be designed as a process connection, with evaluation electronics being arranged in the housing. This makes it possible for the radar transmitter arrangement to fulfill seemingly contradictory requirements: On the one hand, the antenna or radar chip radiates perpendicular to the carrier plate. On the other hand, the carrier plate can have at most the size of the process connection, because this should be arranged in the process connection (e.g. for efficient emission of the microwaves). Furthermore—e.g. for reasons of line running times and/or signal attenuation—the generator and the radar chip should be arranged on the carrier plate or be part of the carrier plate. On the other hand, this means that it is no longer possible (e.g. for reasons of space) to arrange the complex evaluation electronics on the carrier plate as well. Therefore, the evaluation electronics can be arranged on the printed circuit board. Further components—such as communication equipment, e.g. for wireless and/or wired—communication—can also be arranged on the printed circuit board. The L-shaped angled part can advantageously provide a high-frequency connection between the carrier plate and the printed circuit board. In addition, this molded part allows the antenna to be positioned precisely and robustly.

In one embodiment, the L-shaped angled component or mold part is designed as an injection-molded interconnect device (. An MID is an injection-molded plastic component to which metallic conductor tracks are applied. This design allows the antenna to be positioned with particular precision and is also reliable and robust.

Furthermore, the L-shaped angled component can help to realize the radar transmitter array as an SMD component; this can contribute to the realization of a compact, reliable, easy-to-manufacture assembly that integrates the radar transmitter array. Furthermore, the radar transmitter array can be mounted, contacted and overmolded, for example by means of a 3D-molded carrier substrate. The material used for overmolding can, for example, be a plastic, in particular a plastic with good thermal conductivity, so that waste heat can also be dissipated from the components of the carrier substrate.

In one embodiment, the carrier plate is designed as a printed circuit board. The planar antenna can be etched into the printed circuit board as a structure, for example. The generator may be implemented as an open or closed chip on the printed circuit board. This chip may, at least in some embodiments, further include components for controlling and/or evaluating the measurements.

In one embodiment, the carrier plate is designed as a semiconductor substrate. The generator can be integrated into the semiconductor substrate, for example be part of the semiconductor substrate or be arranged on it. Furthermore, components for the control and/or evaluation of the measurements and/or communication devices can be integrated on the semiconductor substrate. The planar antenna can be applied to the semiconductor substrate—for example by means of lithography—as conductive structures, etched into the semiconductor substrate as a structure, epitaxialized and/or produced in some other way. In particular, at high frequencies—e.g., higher than 100 GHz, especially above 200 GHz—the wavelength becomes so small that λ/4 structures can be implemented directly on a chip. In one embodiment, the radar transmitter array may be implemented as a surface mount device (SMD) in a quad flat no leads package (QFN), ball grid array (BGA), or embedded wafer level ball grid array (eWLP) package, e.g., a system on chip (SoC).

Such an SMD component can be used, for example, to be mounted on a printed circuit board using conventional assembly and soldering technology.

In one embodiment, the generator is part of a semiconductor chip. The semiconductor chip may contain further system parts, e.g. for the control and/or evaluation of the measurements, for the communication and/or for the voltage supply of the measuring device.

In one embodiment, the radar transmitter arrangement further comprises a high frequency lens or dielectric lens, the high frequency lens being arranged in a radiation direction of the planar antenna to thereby influence the radiation characteristic of the planar antenna. Such a high-frequency lens can be used to modify the radiation pattern so as to achieve the narrowest possible radiation angle. For example, at frequencies greater than 200 GHz, aperture angles of a few degrees, e.g., less than 5°, can be achieved with lenses in the range of 15 to 20 mm in diameter. The lenses can be made of, for example, high-density polyethylene (HDPE), PTFE (polytetrafluoroethylene), PEEK (polyetheretherketone), silicon or ceramics and/or have at least one of these materials.

In one embodiment, the radar transmitter arrangement further comprises a housing within which the radar transmitter arrangement is arranged. Together with the lateral radiation of the radar signal (see above), the printed circuit board can be mounted longitudinally in the housing of a sensor and in this way the space can be optimally utilized.

In one embodiment, the housing is implemented as a process connection or as part of a process connection. In one embodiment and/or modification, at least part of the housing has an external thread. As a result, an integrated, robust system for a wide range of applications can be provided—with relatively low design effort. In particular, due to the external thread, an easy-to-apply measuring device can be provided, which ensures a high tightness of the process connection by screwing it in.

In one embodiment, the housing has a first section and a second section along its length, the second section having a larger cross-section than the first section. In one embodiment and/or variation, the second section is at least partially implemented as an external thread. This constructive solution contributes to a simple assembly. Furthermore, in a further embodiment and/or variation, it is thereby possible to move the L-shaped angled component or molded part even closer to the process-side end of the housing, thereby making the housing even more compact.

In one embodiment, the housing is made in one piece. This can lead to further advantages in terms of process tightness. Furthermore, this can simplify the manufacturing process.

In one embodiment, the housing is made of plastic, particularly polyvinylidene difluoride, PVDF, polytetrafluoroethylene, PTFE, polyetheretherketone, PEEK, or polypropylene, PP, or has at least one of these materials.

In one embodiment, the microwaves have a frequency of at least 40 GHz, for example, of at least 140 GHz, of at least 200 GHz. These frequency ranges can contribute to a higher resolution, e.g. for level measurement and/or topology detection. Furthermore, these frequencies can contribute to a further miniaturization of the entire system; for example, the radar transmitter arrangement can advantageously be integrated on a semiconductor chip.

Another aspect relates to a use of a radar transmitter arrangement as described above and/or below for level measurement, for level limit determination and/or for topology detection, for area monitoring and/or for manufacturing automation.

For further clarification, the invention is described with reference to embodiments illustrated in the figures. These embodiments are to be understood only as examples and not as limitations. The illustrations in the following figures are schematic and not to scale.

BRIEF DESCRIPTION OF THE FIGURES

It shows.

DETAILED DESCRIPTION OF EMBODIMENTS

Figure 1:
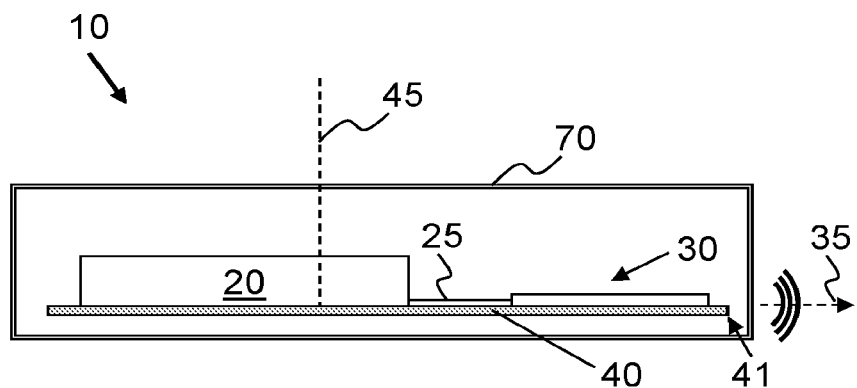
FIG. 1 a schematic sketch of a radar transmitter arrangement according to an embodiment in side view.

FIG. 1 shows a schematic sketch of a radar transmitter arrangement according to one—embodiment in side view. The radar transmitter arrangement 10 has a carrier plate 40. The carrier plate 40 may be implemented, for example, as a printed circuit board or as a semiconductor substrate. Furthermore, a surface normal 45 to the carrier plate 40 is drawn. A generator 20 is integrated on the carrier plate 40. The generator 20 is arranged to generate microwaves. The semiconductor chip comprising the generator 20 may include further system parts, e.g. for the control and/or evaluation of the measurements, for the communication and/or for the voltage supply of a measuring device, within which the carrier plate 40 is integrated. Further details, such as supply lines to the semiconductor chip, are not shown.

The carrier plate 40 further includes a planar antenna 30 connected to the generator 20 via a line 25. The planar antenna is placed near an edge 41 of the carrier plate 40. The planar antenna 30 is arranged to transmit the microwaves from the generator 20 and has a radiation direction or main radiation direction 35, which is outlined by an arrow. The planar antenna 30 and the radiation direction 35 are arranged substantially perpendicular to a surface normal 45 of the carrier plate 40.

Especially at high frequencies, the wavelength of the microwaves can become so small that $\lambda/4$ structures or correspondingly other antenna structures can be implemented directly on the semiconductor substrate 40.

The carrier substrate 40 can be installed in an SMD package 70 for later mounting on a printed circuit board using a standard process (e.g. soldering or gluing). The SMD package has corresponding contact points on the underside for this purpose.

Figure 2A:
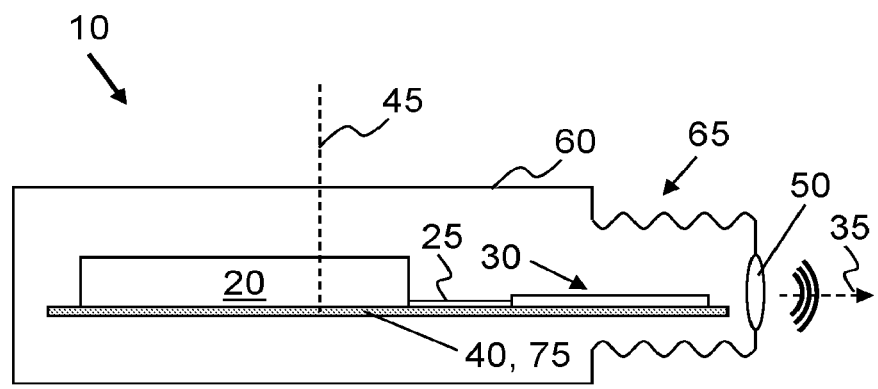
FIG. 2a a schematic sketch of a radar transmitter arrangement according to a further embodiment in side view.
Figure 2B:
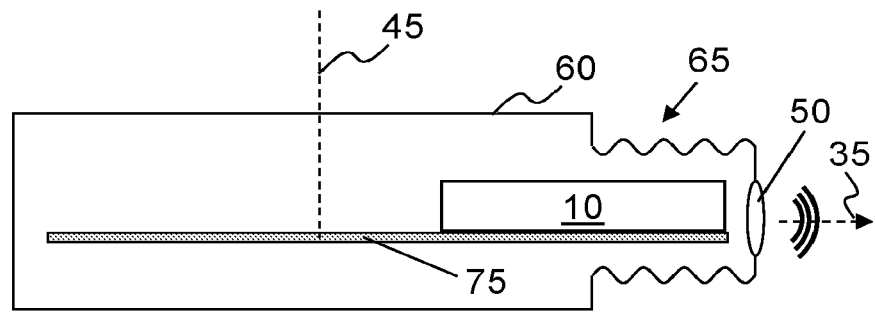
FIG. 2b a schematic sketch of a radar transmitter arrangement according to a further embodiment in side view.

FIGS. 2a and 2b show schematic sketches of a radar transmitter arrangement 10 according to a further embodiment in side view. The same reference signs as in FIG. 1 denote the same or similar elements. In the embodiment example of FIG. 2a, the radar transmitter arrangement 10 is advantageously arranged in a housing 60, which can be part of a sensor or measuring device. In this way, the space in the housing 60 can be optimally utilized. Advantageously, the planar antenna 30 is further placed near an edge of the carrier plate 40 or, in an alternative embodiment, the printed circuit board 75, and the microwaves or radar signal are radiated laterally towards a lens 50. The embodiment further shows the high-frequency lens 50, which can help to focus the microwaves and thus achieve a narrow radiation angle. This can be particularly advantageous for long measurement distances, e.g. to measure the level, gauge and/or surface topology in a large container or measurement tank or over a river bed.

In FIG. 2b, the embodiment example from FIG. 1 is installed as an SMD component 10 on a printed circuit board 75 in a sensor housing 60. The radiation is the same as in the embodiment example of FIG. 2a.

The housing 60 shown can also be implemented as a process connection or as part of a process connection. In this case, for example, the termination area 65 on the process side can be designed to be particularly robust against thermal, mechanical and/or chemical materials. In this way, a robust system for a wide range of applications can be provided—with relatively low design effort.

Figure 3A:
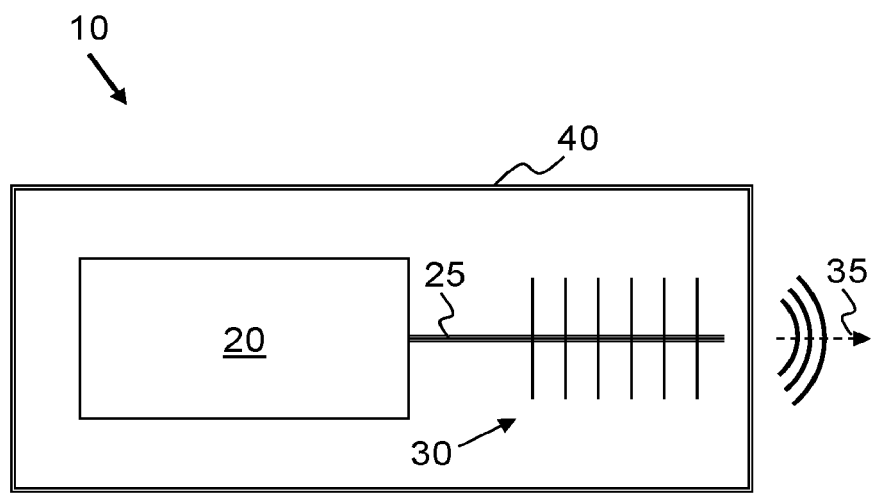
FIG. 3a a schematic sketch of a radar transmitter arrangement according to one embodiment in plan view.

FIG. 3a shows a schematic sketch of a radar transmitter arrangement 10 according to one embodiment in plan view (along the surface normal 45). This embodiment may correspond, for example, to the embodiment of FIG. 1. The radar transmitter arrangement 10 comprises a carrier plate 40. The carrier plate 40 may be, for example, a printed circuit board or a semiconductor substrate. A generator 20 and a planar antenna 30 are arranged on the carrier plate 40. The generator 20 and the planar antenna 30 are connected via a line 25. In the schematically shown embodiment example, the planar antenna 30 is designed as a so-called Yagi antenna. The Yagi antenna is placed near an edge of the carrier plate 40. The Yagi antenna 30 is arranged to transmit the microwaves from the generator 20 and has a radiation direction or main radiation direction 35, which is shown by an arrow.

Figure 3B:
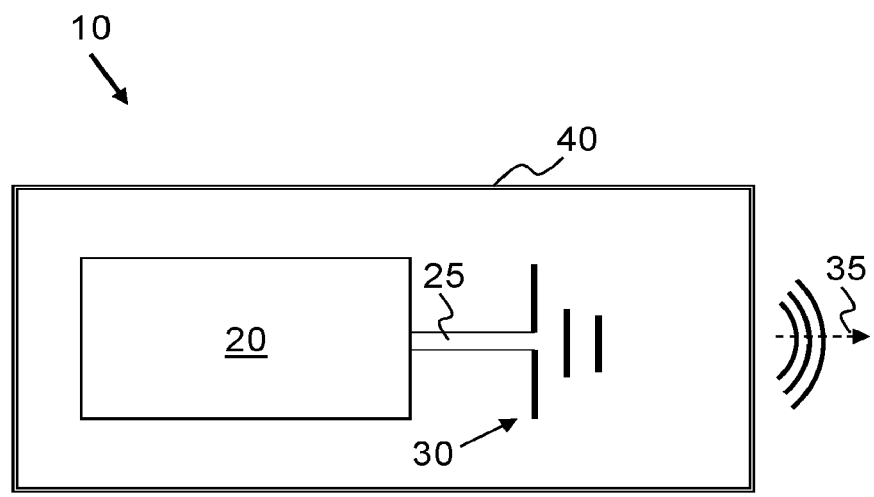
FIG. 3b a schematic sketch of a radar transmitter arrangement according to a further embodiment in plan view.

FIG. 3b shows a schematic sketch of a radar transmitter arrangement 10 according to a further embodiment in plan view. Identical reference signs as in FIG. 3a denote identical or similar elements. In this schematically shown embodiment, the planar antenna 30 is designed as a so-called quasi-Yagi antenna.

Figure 3C:
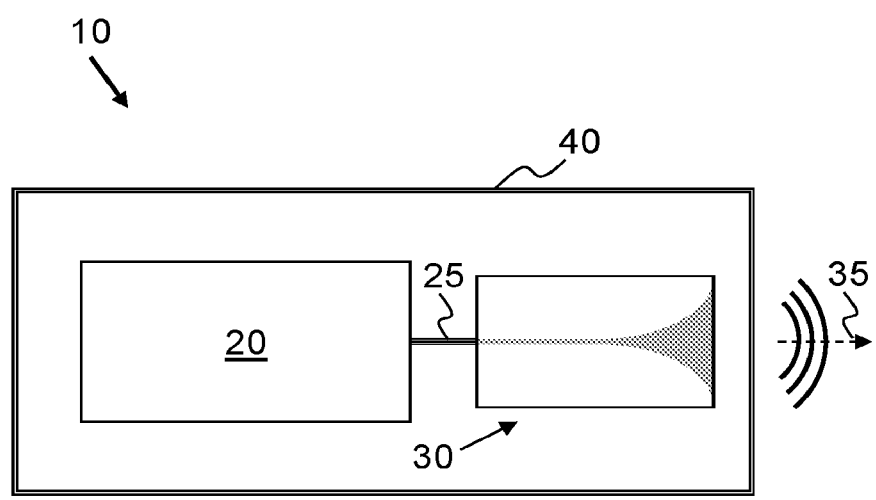
FIG. 3c a schematic sketch of a radar transmitter arrangement according to a further embodiment in plan view.

FIG. 3c shows a schematic sketch of a radar transmitter arrangement 10 according to a further embodiment in plan view. Identical reference signs as in FIG. 3a denote identical or similar elements. In this schematically shown embodiment, the planar antenna 30 is designed as a so-called Vivaldi antenna.

Figure 4:
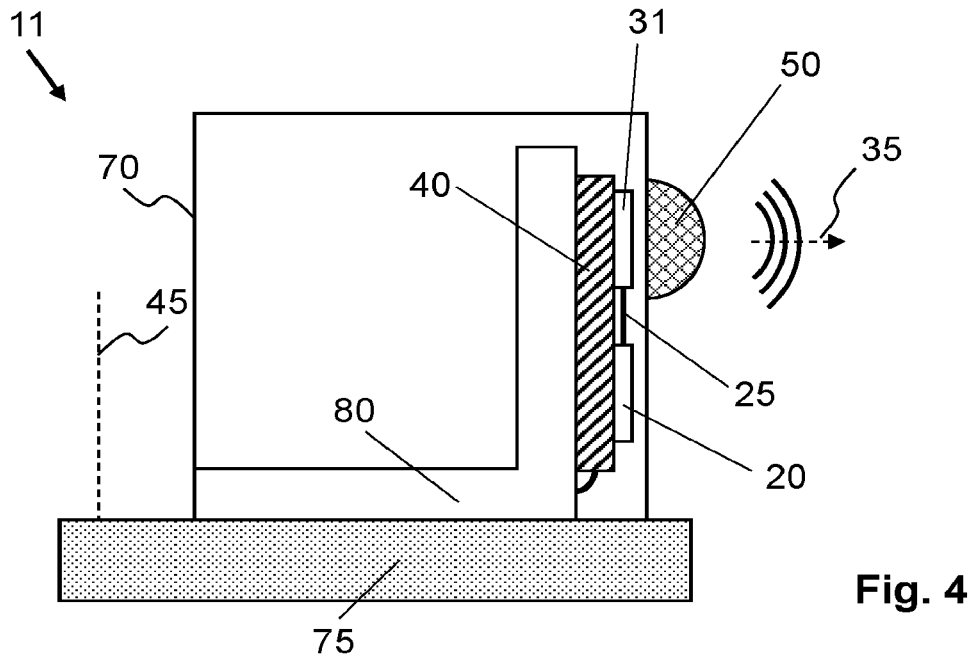
FIG. 4 a schematic sketch of a radar transmitter arrangement according to a further embodiment in side view.

FIG. 4 shows a schematic sketch of a radar transmitter arrangement 11 according to a further embodiment in side view. The radar transmitter arrangement 11 has a carrier plate 40. A generator 20 in the form of a semiconductor chip is arranged on the carrier plate 40. The generator 20 is arranged to generate microwaves. Furthermore, an antenna 31 is arranged on the carrier plate 40. The antenna 31 is designed as a planar antenna which has a main radiation direction 35 in the direction of its surface normal. The antenna 31 is connected to the generator 20 via the line 25 and is arranged to transmit the microwaves from the generator 20. The antenna may be a patch antenna, for example. Both the carrier plate 40 and the antenna 31 are arranged substantially perpendicular to the printed circuit board 75 by means of an L-shaped angled shaped member 80. The L-shaped angled molded part 80 may be, for example, an injection molded interconnect device (MID). The MID may be assembled, contacted, and packaged by means of an overmold 70. Further, the molded component may include a lens 50 for further focusing the radiated microwave signal.

Figure 5:
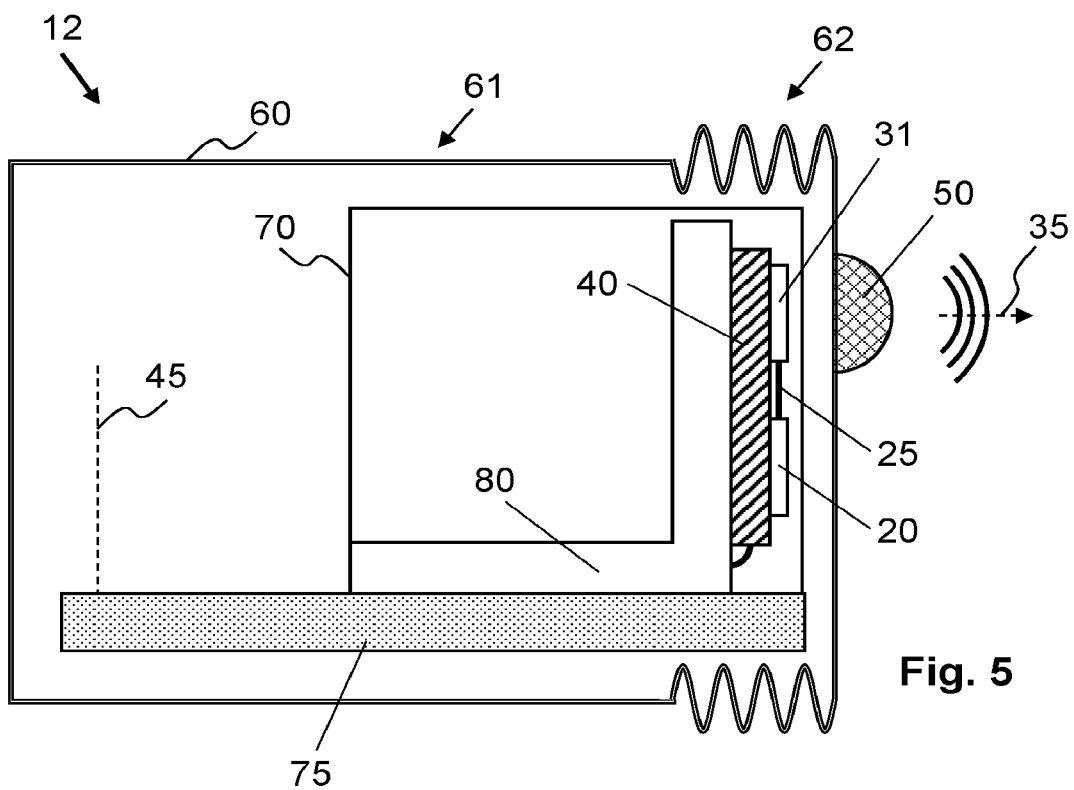
FIG. 5 a schematic sketch of a radar transmitter arrangement according to a further embodiment in a lateral section.

FIG. 5 shows a schematic sketch of a radar transmitter arrangement 12 according to a further embodiment in a lateral section. FIG. 5 shows substantially all the elements of FIG. 4; in this connection, identical reference signs denote identical or similar elements. Furthermore, FIG. 5 shows a housing 60 in which the radar transmitter arrangement 11 of FIG. 4 is arranged. Here, the housing 60 has a first section 61 and a second section 62 in its longitudinal—extension, the second section 62 having a larger cross-section than the first section 61.

Further, the second section 62 is at least partially configured as an external thread. Such an embodiment can be easily screwed into a thread, for example, so that the process tank, for example, can be well terminated therewith. Thus, the printed circuit board 75 can be moved even further towards the lens 50 or be part of the packaged component, e.g., the SMD package 70; in particular, a part of the radar transmitter arrangement 11 of FIG. 4 can be arranged in the second section 62, thereby contributing to the implementation of a particularly compact measuring device.

Supplementally, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

LIST OF REFERENCE SIGNS 10, 11 radar transmitter array
20 generator
25 line
30 planar antenna with main radiation in the antenna plane
31 planar antenna with main radiation perpendicular to the antenna plane
35 direction of radiation
40 support plate
41 edge of the carrier plate
42 angled fitting
43 overmolding
45 normal to carrier plate
50 high frequency lens
60 sensor housing
60, 61 first and second sections of the sensor housing, respectively 70 SMD housing
75 circuit board
80 component or molded part, L-shaped

The invention claimed is:

1. A radar transmitter having a sensor and for process and manufacturing automation, for distance measurement, for level measurement and/or for limit level determination, the radar transmitter comprising:
   a generator configured to generate microwaves;
   an antenna connected to the generator and configured to transmit the microwaves from the generator; and
   a carrier plate,
   wherein the antenna, by way of an L-shaped angled molded part, is arranged substantially perpendicular to a surface of a printed circuit board and is configured to transmit the microwaves perpendicular to a surface normal of the printed circuit board,
   wherein the radar transmitter is implemented as a surface-mounted device (SMD) component.

2. The radar transmitter according to claim 1,
   wherein the L-shaped angled molded part is implemented as an injection-molded circuit carrier, MID, or as a semiconductor substrate.

3. The radar transmitter according to claim 1,
   wherein the carrier plate is the printed circuit board or is a semiconductor substrate.

4. The radar transmitter according to claim 1,
   wherein the surface-mounted device (SMD) component is mounted on the printed circuit board by way of surface-mount technology.

5. The radar transmitter according to claim 1,
   wherein the generator is part of a semiconductor chip.

6. The radar transmitter according to claim 1, further comprising a radio frequency lens, wherein the radio frequency lens is arranged in a radiation direction of the antenna to thereby influence the radiation characteristic of the antenna.

7. The radar transmitter according to claim 1, further comprising a housing within which the radar transmitter is disposed.

8. The radar transmitter according to claim 7, wherein the housing is configured as a process connection or as part of the process connection.

9. The radar transmitter according to claim 7, said housing having a first and a second portion in its longitudinal extension, said second portion having a larger cross-section than said first portion.

10. The radar transmitter according to claim 9, wherein the second portion is at least partially configured as an external thread.

11. The radar transmitter according to claim 7, wherein the housing is made in one piece.

12. The radar transmitter according to claim 7, wherein the housing comprises plastic being one of polyvinylidene difluoride (PVDF), polytetrafluoroethylene (PTFE), polyetheretherketone (PEEK), and polypropylene (PP).

13. The radar transmitter according to claim 1, wherein the microwaves have a frequency of at least 40 GHz.

14. The radar transmitter according to claim 1,
    wherein the microwaves have a frequency of at least 140 GHz.

15. The radar transmitter according to claim 1,
    wherein the microwaves have a frequency of at least 200 GHz.

16. The radar transmitter according to claim 2,
    wherein the carrier plate is the printed circuit board, the semiconductor substrate, or a semiconductor chip.

17. The radar transmitter according to claim 8,
    said housing having a first and a second portion in its longitudinal extension, said second portion having a larger cross-section than said first portion.

18. The radar transmitter according to claim 8, wherein the housing is made in one piece.

19. The radar The radar transmitter according to claim 9, wherein the housing is made in one piece.

20. A method implemented with a radar transmitter having a sensor and for process and manufacturing automation, for distance measurement, for level measurement and/or for limit level determination, comprising:
    generating microwaves using a generator;
    an antenna connected to the generator and configured to transmit the microwaves from the generator; and
    a carrier plate,
    wherein the antenna, by way of an L-shaped angled molded part, is arranged substantially perpendicular to a surface of a printed circuit board, wherein the radar transmitter is implemented as surface-mounted device (SMD) component, and is configured to transmit the microwaves perpendicular to a surface normal of the printed circuit board.

* * * * *